United States Patent [19]

Yazawa et al.

[11] Patent Number: 4,657,585
[45] Date of Patent: Apr. 14, 1987

[54] METHOD FOR SEPARATING COBALT, NICKEL AND THE LIKE FROM ALLOYS

[75] Inventors: Akira Yazawa; Kimio Itagaki, both of Sendai; Kazuo Sezaki, Funabashi; Kenji Matsuda, Matsuko; Kazuo Kanazawa; Mitsuo Hayashi, both of Yokohama; Katsuo Katada, Kamakura, all of Japan

[73] Assignee: Ishikawajima-Harima Jukogyo Kabushi Kaisha, Tokyo, Japan

[21] Appl. No.: 802,248

[22] Filed: Nov. 27, 1985

[30] Foreign Application Priority Data

Nov. 29, 1984 [JP] Japan ................. 59-252474
Nov. 29, 1984 [JP] Japan ................. 59-252475
Nov. 29, 1984 [JP] Japan ................. 59-252476

[51] Int. Cl.[4] ........................................ C21C 7/00
[52] U.S. Cl. ................................. 75/63; 75/65 R; 75/82; 420/129
[58] Field of Search ................ 75/63, 65 R, 82, 129

[56] References Cited

U.S. PATENT DOCUMENTS

| 2,029,898 | 2/1936 | Schmidt | 75/63 |
| 3,685,985 | 8/1972 | Dobbener | 75/63 |
| 4,025,335 | 5/1977 | Morimoto | 75/63 |
| 4,299,376 | 11/1981 | Weiss | 75/63 |

Primary Examiner—Peter D. Rosenberg

[57] ABSTRACT

Cobalt, nickel and/or radioactive cobalt are separated from an alloy containing elements belonging to the iron group or family in such a manner that the alloy is melted in a molten bath of tin, lead and/or an alloy thereof whose weight is more than ten times as heavy as the alloy and then silicon is added to the molten bath so that a Fe-Si phase floats up and is separated, concentrating the cobalt and nickel in said bath.

11 Claims, 10 Drawing Figures

METHOD FOR SEPARATING COBALT, NICKEL AND THE LIKE FROM ALLOYS

BACKGROUND OF THE INVENTION

The present invention relates to a method for separating and or concentrating cobalt and nickel and the like from alloys which can be advantageously applied to volume-reducing and decontamination of solid waste from nuclear power plants, separation of cobalt, nickel and the like from manganese nodules and from suitable iron alloys.

In general, it has been considered technically difficult to separate iron group metals such as cobalt, nickel and the like from iron alloys pyrometallurgically.

However, such technical method for separating cobalt, nickel and the like from iron alloys is very important, for instance, in decommissioning or dismantling and removing nuclear power plants having noninflamable solid waste to be processed, for separating or concentrating cobalt, nickel and the like from manganese nodules or in concentrating iron alloys.

For instance, the noninflamable waste from the nuclear power plant includes air-conditioning filters, heat-insulating materials, various kinds of metals, concrete and so on. Such nonflammable waste materials are stored in cans. In the case of a boiling water reactor with a capacity of 1100 MW, the waste materials mount to about 500 cans a year. Such noninflamable materials are less in quantity than other waste so that they are stored without being subjecting to volume reduction processes, but it is quite apparent that some countermeasures must be taken in the future when the noninflamable materials are increasedly accumulated. Meanwhile, methods for decommissioning and removing a terminated nuclear power plant have been studied. In decommissioning and removing an old nuclear power plant, a great quantity of noninflamable materials must be handled so that methods for reducing their volumes have intensively studied. With respect to volume reduction of noninflamable waste materials, it is also very important to develop a method for removing radioactive materials mixed with and attached to the waste materials; that is, a decontamination method. Furthermore it is preferable to recover nonradioactive metals effectively.

In nuclear power plants, corrosion products are irradiated with neutrons in the core and become radioactivated. Such radioactive materials are entrained in cooling water and accumulate on inner surfaces of various devices and equipment of the nuclear power plants. In this case, nuclear species contribute the strength of radiation as shown in FIGS. 1(A) and 1(B). FIG. 1(A) shows radioactive decay of inner wall surfaces contaminated with sediment in boiling water reactor (BWR) and FIG. 1(B), radioactive decay of radioactive corrosion products in pressurized water reactor (PWR). It is seen from these graphs that in both of BWR and PWR, their devices and equipment are contaminated mainly with $^{60}Co$.

There has not yet been proposed a satisfactory method for separating the iron group metals such as $^{60}Co$ attached to and mixed with carbon steel and stainless steel since Fe and Co are in the same group in the periodic table and are quite similar physically and chemically.

Meanwhile, in order to recover valuable metals such as Co and Ni from manganese nodules, research and development of hydrometallurgical refining processes such as cuprion-ammonia leaching process and high-temperature high-pressure sulfuric-acid leaching process has been made. The hydrometallurgical refining processes can be carried out at relatively low temperatures so that they can be said to be energy-saving processes, but they have the problems that large quantities of chemical agents and water are needed and that a large area is needed. Furthermore, there are problems of how to transport low-quality minerals such as manganese nodules, garnierite or tetrite and how to dispose large quantities of waste after refining. Therefore there has not yet been proposed an effective preliminary process for concentrating valuable metals from such low-quality minerals.

In view of the above, the present invention has its object to provide a method for separating iron alloys having extremely low concentrations of cobalt and nickel and to provide iron alloys having a high concentration of cobalt and nickel by utilizing a kind of the pyrometallurgical solvent extraction processes. Another object of the present invention is to provide effective separation of radioactive cobalt from iron alloys of solid waste materials discharged from nuclear power plants, thereby obtaining Fe Co alloys having an extremely low concentration of $^{60}Co$, and to provide remarkable reduction of the volume of concentrated Fe.$^{60}Co$ alloys. The present invention has a further object for subjecting low-quality minerals such as manganese nodules and scraps to a pyrometallugical process so that the quantities of chemical agents and water needed for wet refining of cobalt and nickel can be decreased.

The above and other objects, effects and features of the present invention will become more apparent from the following description of preferred embodiments thereof taken in conjunction with the accompanying drawings.

DETAILED DESCRIPTION OF THE PREFERRED EMBODIMENTS

Figure 1A:
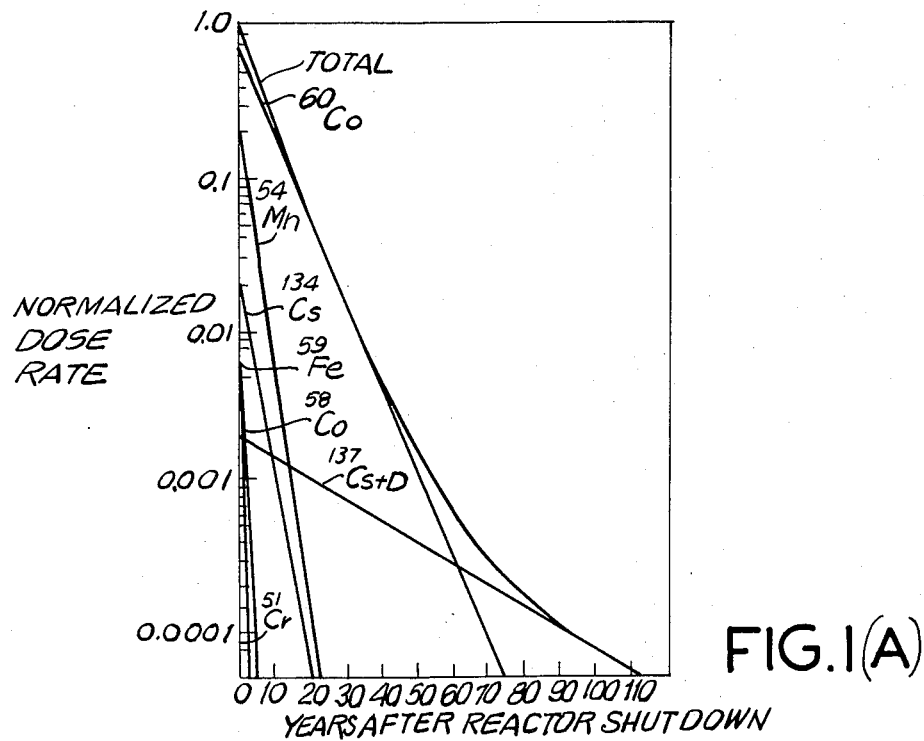
FIGS. 1(A) and 1(B) are graphs indicating the contribution of nuclear species to radioactivity of corrosion products in a boiling water reactor and a pressurized water reactor respectively.
Figure 1B:
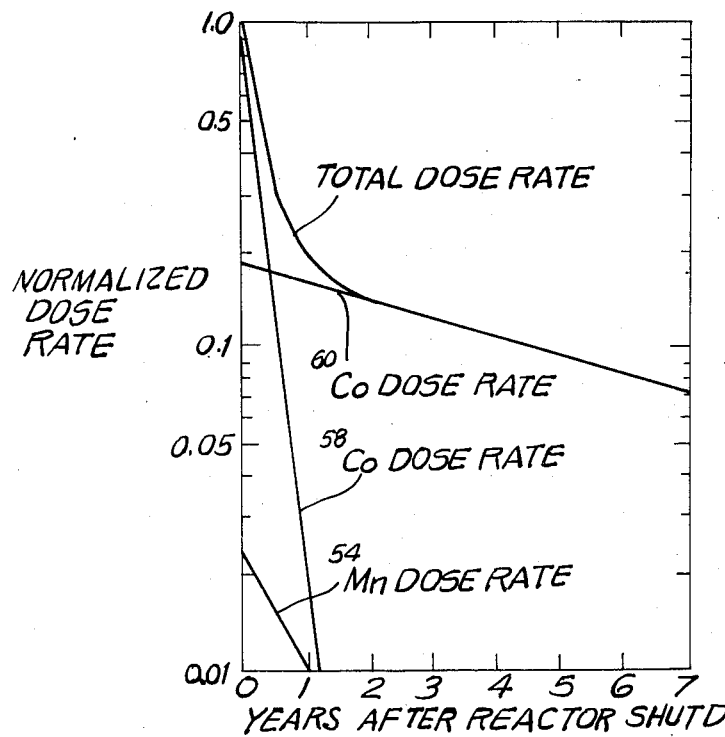
Figure 2:
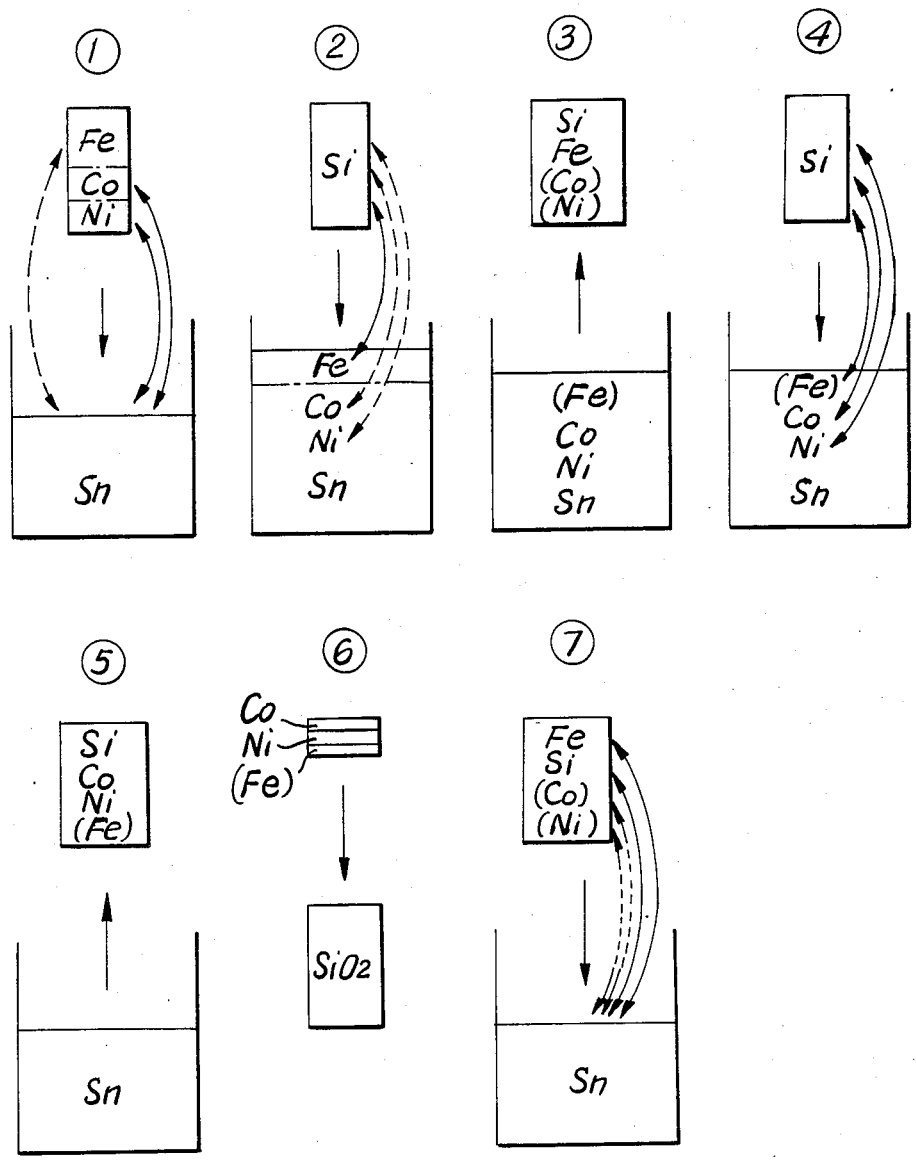
FIG. 2 shows schematically the steps of a first embodiment of the present invention for separating cobalt and nickel.

FIG. 2 shows a first embodiment of the present invention in which
- ① a step for melting an iron alloy in a molten bath of, for instance, tin;
- ② a step for adding silicon;
- ③ a step for separating a Fe-Si phase;
- ④ a step for further adding silicon;
- ⑤ a step for separating a Fe.Co.Ni-Si phase;
- ⑥ a step for separating Si; and
- ⑦ a step for remelting a Fe.Co.Ni alloy are coupled.

In the first step for melting an iron alloy in a molten bath, a Fe.Co.Ni alloy is charged into molten bath of tin, or lead and/or an alloy thereof whose weight is more than ten times as much as that of the Fe.Co.Ni alloy.

In the second step for adding silicon, Si is charged as indicated by the solid-line arrow so that the solubility of Fe in Sn or Pb is decreased and a Fe-Si primary phase separates and floats up in the molten bath while major parts of Co and Ni remain in the bath.

In the third step for separating the Fe-Si phase, the Fe-Si phase is separated removed ffrom the bath and recovered as a mixture as indicated by the arrow.

In the fourth step for further adding Si, additional Si is further added into the molten bath as indicated by the arrow so that the solubility of Co and Ni in Sn or Pb is decreased and as indicated by the solid lines and the formation of the Fe.Co.Ni-Si secondary phase is facilitated. Furthermore, any small quantity of Fe still remaining after the separation step is combined with Si and such mixture floats up in the molten bath.

In the fifth step for separating Fe.Co.Ni-Si phase, the floating mixture of Fe, Co, Ni and Si is removed and recovered.

In the sixth step for separating Si, an oxidization process at low temperatures according to the prior art is utilized so that Si in the mixture of Fe, Co, Ni and Si is oxidized into $SiO_2$, which is then removed.

In the seventh step for remelting a Fe.Co.Ni alloy, the mixture of Fe, Co and Ni is charged again into the molten bath and melted and the above-described second to seventh steps are repeated to complete the concentration and separation.

The broken lines in FIG. 2 show the bonding strength weaker than that indicated by the solid line.

As described above, according to the present invention, two immiscible liquid phases are formed and the separation or condensation is effected using the difference in distribution ratio among Fe, Co and Ni in the two immiscible liquid phases.

Figure 3:
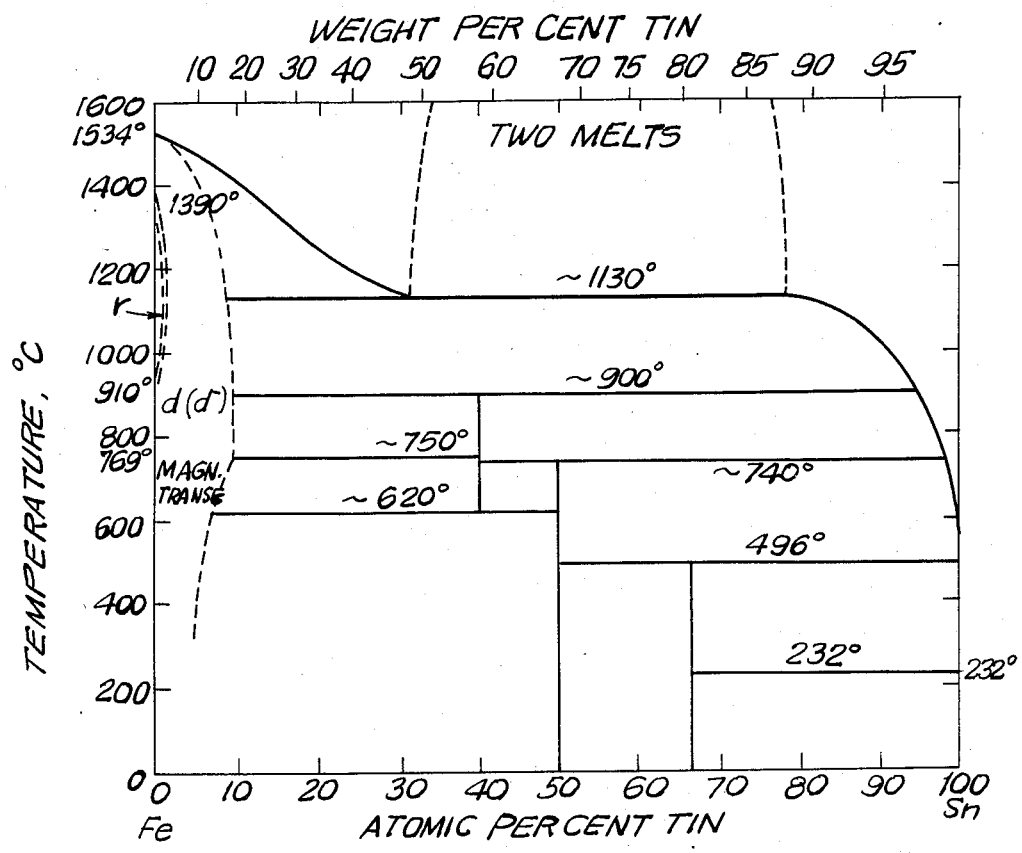
FIG. 3 is a phase diagram of a binary Fe-Sn alloy used for the explanation of the underlying principle of the present invention.
Figure 4:
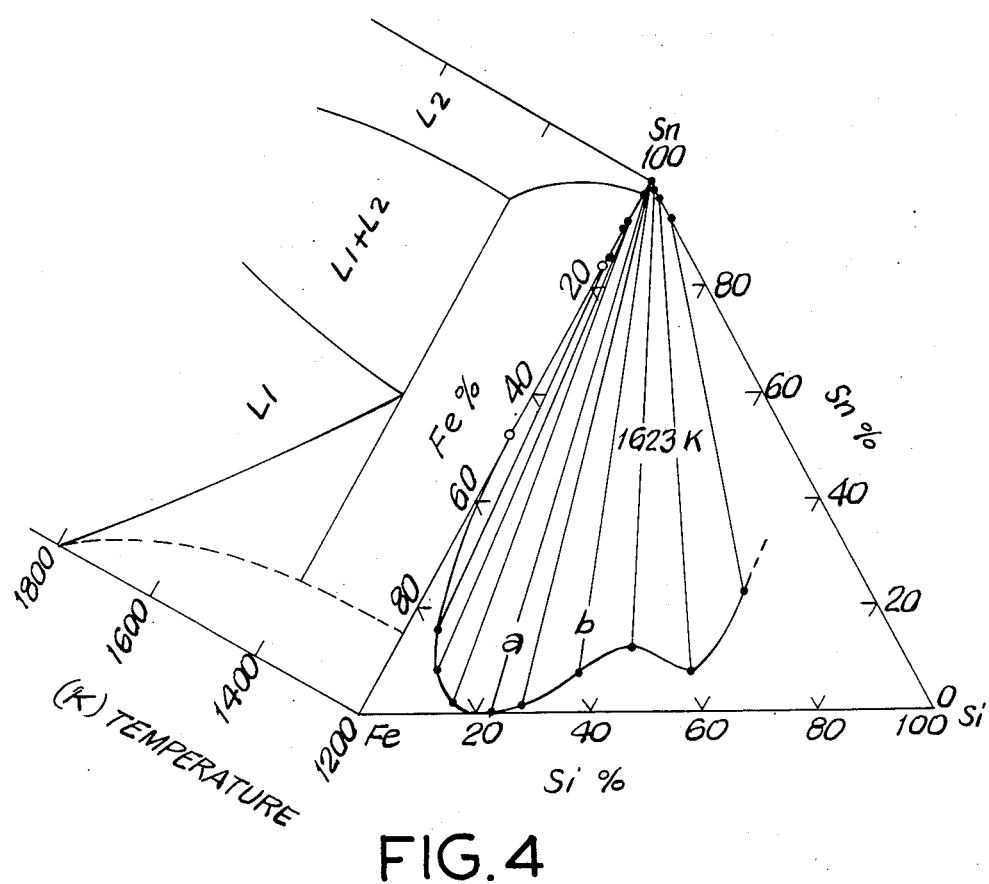
FIG. 4 is a phase diagram of a ternary Fe Sn-Si alloy used for the explanation of the underlying principle of the present invention.

The underlying principle of the present invention will be further described in detail with reference to FIGS. 3 and 4. FIG. 3 is a binary equilibrium phase diagram for a Fe.Sn alloy and FIG. 4 is a ternary equilibrium phase diagram for a Fe.Sn-Si alloy. It is seen from FIG. 3 that within a temperature range between about 1130° to 1400° C., about 12% of Fe at most is melted into Sn. Furthermore it is seen from FIG. 4 that two typical immiscible alloy systems (a) and (b) exist at 1350° C. as indicated in TABLE 1.

TABLE 1

Equilibrium composition (at 1350° C.) of two typical immiscible liquid phases in ternary Fe.Sn—Si alloy system

| coexistence system | composition of Fe—Si rich phase (wt %) | | | composition of Sn rich phase (wt %) | |
|---|---|---|---|---|---|
| | Fe | Si | Sn | Fe | Si |
| (a) | 79.0 | 20.0 | 1.0 | 0.33 | 0.10 |
| (b) | 58.0 | 33.7 | 8.3 | 0 | 0.12 |

It is seen from (a) that almost all Fe in Sn is separated as a Fe-Si phase and it is also seen from (b) that all Fe in Sn is separated as a Fe-Si Sn phase.

The present invention is based upon the above-described underlying principle and utilizes the fact that the distribution ratio of Co and Ni in the Fe.Sn phase and the Fe-Si phase is greater than that of Fe.

A first practical example of a first embodiment

Figure 5:
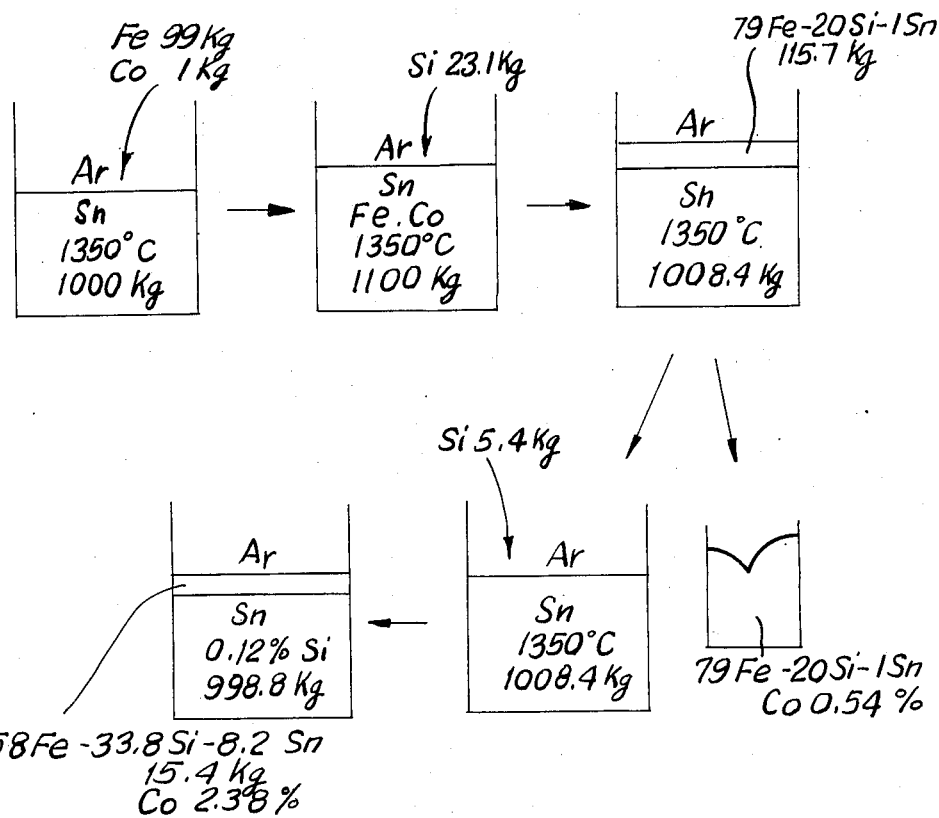
FIG. 5 shows the practical steps of the first embodiment of the present invention.

As shown in FIG. 5, a furnace containing 1000 kg of Sn is maintained at 1350° C. under an Ar $N_2$ atmosphere and 100 kg of a Fe Co alloy containing 1% of Co is charged thereto, vigorously mixed and melted. Thereafter 23.1 kg of Si is charged so that 115.7 kg of a Fe-Si phase consisting of 79% of Fe and 20% of Si and 1% of Sn floats above 1008.4 kg of a Sn phase containing 0.85% of Fe and 0.10% of Si. The Fe-Si phase contains 0.54% of Co and is an iron alloy in which the initial quantity of Co is reduced to one half. After the Fe-Si phase has been removed, 5.4 kg of Si is further added to and melted in the molten Sn bath so that 15.4 kg of a Fe-Si phase consisting of 58% of Fe, 33.8% of Si and 8.2% of Sn floats above the Sn phase which is almost devoid of Fe and Co an only 0.12% of Si. The Fe-Si phase contains 2.38% of Co. Thus, an iron alloy in which the initial quantity of Co is increased or concentrated about 2.5 times is obtained.

A second example of the first embodiment

Figure 6:
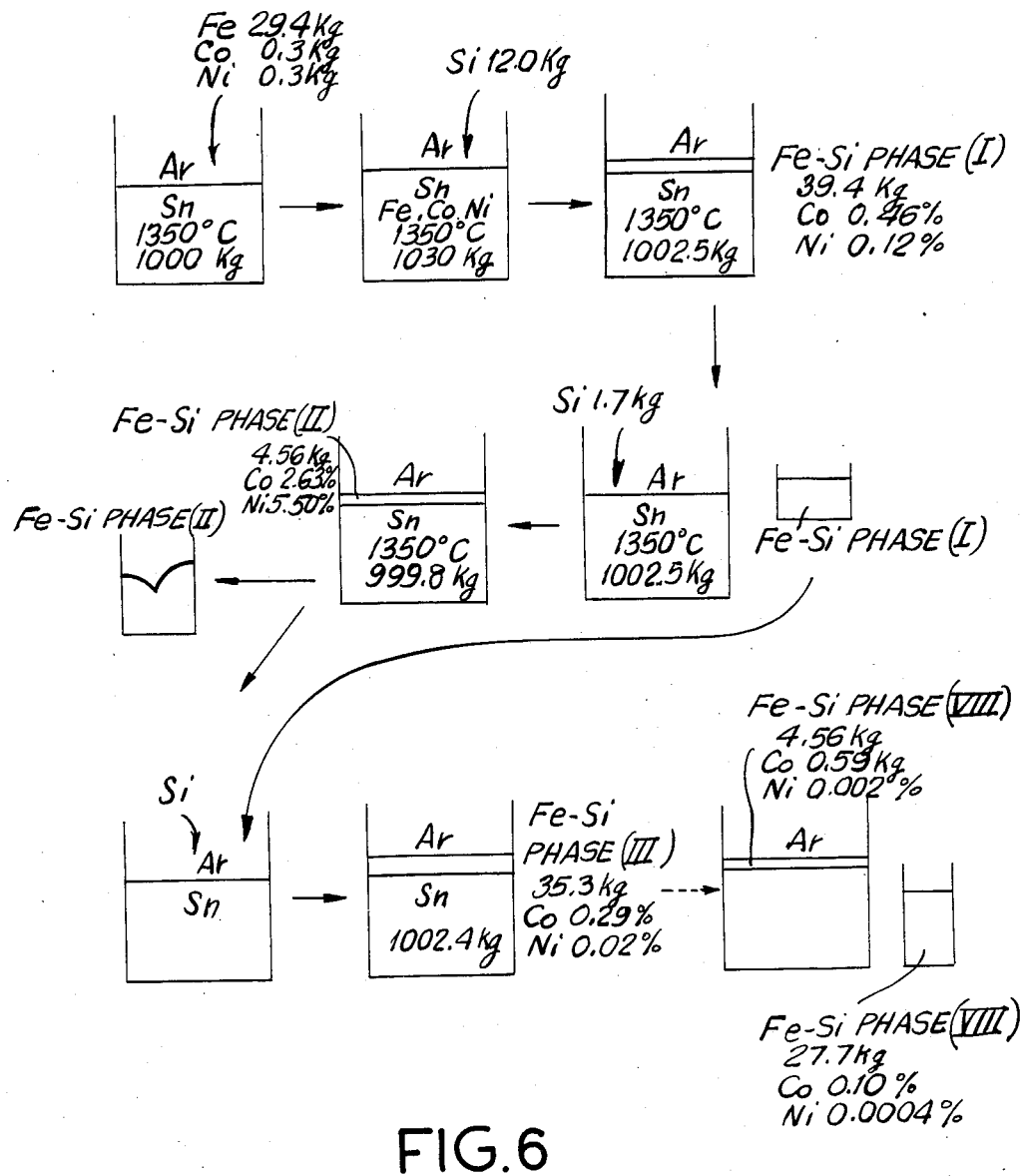
FIG. 6 shows another series of practical steps of the first embodiment of the present invention.

As shown in FIG. 6, 1000 kg of Sn is maintained at 1350° C. under an Ar atmosphere and 30 kg of a Fe alloy containing 1% of Co and 1% of Ni is charged, vigorously mixed and melted. Thereafter 12.0 kg of Si is added and melted. Then 1002.5 kg of a Sn phase and 39.4 kg of a supernatant Fe-Si phase coexist. The Fe-Si phase contains 0.46% of Co and 0.12% of Ni. The Fe-Si phase is defined as a Fe-Si phase (I), which is separated and removed from the Sn phase by tilting the furnace and then 1.7 kg of Si is further charged into the furnace. Then, 999.8 kg of a Sn phase and 4.56 kg of a Fe-Si phase coexist. This Fe-Si phase is defined as the Fe-Si phase (II). The Fe-Si phase (II) contains 2.63% of Co and 5.50% of Ni.

After the Fe-Si phase (II) is separated from the Sn phase, the Fe-Si phase (I) is recharged into the Sn bath and when the quantity of Si is so adjusted that the Fe-Si phase (III) contains 27.8% of Si, 1002.4 kg of a Sn phase and 35.3 kg of a Fe-Si phase (III) coexist. The Fe-Si phase (III) contains 0.29% of Co and 0.02% of Ni. After the Fe-Si phase (III) has been separated from the Sn phase, 1.7 kg of Si is added to the Sn bath. Then, a Fe-Si phase (IV) floats up and contains 1.67% of Co and 0.90% of Ni. When the step for separating the Fe-Si phase (IV) and recharging the Fe-Si phase (III) into the Sn bath so that a Fe-Si phase (V) is formed and the steps for adding 1.7 kg of Si so that a Fe-Si phase (VI) floats up are repeated, 27.2 kg of a Fe-Si phase (VII) containing 0.10% of Co and 0.0004% of Ni and 4.56 kg of a Fe-Si phase (VIII) containing 0.59% of Co and 0.002% of Ni are obtained. Therefore, an iron alloy in which the content of Co is reduced to 1/10 and the content of Ni is reduced to 4/10000 is obtained by four solvent extraction operations. In the Fe-Si phase (II), 0.25 kg or 83% of the initial quantity (0.30 kg)) of Ni and 0.13 kg or 40% of the initial quantity (0.30) kg of Co are recovered. Therefore when the Fe-Si phase (IV) is included, 97% of Ni and 65.4% of Co are recovered.

A third example of the first embodiment

The inventors investigated the effects of Sn and Pb upon the enrichment of Co and Ni which inevitably results from the processes of removing Co and Ni from iron alloys and the results are shown in TABLE 2.

TABLE 2

| Compositions of Pb—Sn—Fe systems (at 1250° C.) | | | | | | | | | | | | | | |
|---|---|---|---|---|---|---|---|---|---|---|---|---|---|---|
| Pb—Sn phase (wt %) | | | | | Fe phase (wt %) | | | | | | | | | |
| Sn | Pb | Fe | Co | Ni | Fe | Sn | Pb | Co | Ni | L:Co | L:Ni | L:Fe | Co | Ni |
| 72.4 | 22.4 | 3.90 | 0.42 | 0.77 | 68.6 | 26.7 | 0.88 | 2.92 | 0.91 | 0.144 | 1.176 | 0.057 | 2.54 | 20.7 |
| 63.6 | 31.2 | 3.61 | 0.42 | 1.05 | 62.6 | 30.7 | 2.02 | 2.97 | 1.63 | 0.153 | 0.642 | 0.057 | 2.65 | 11.2 |
| 60.6 | 35.6 | 2.50 | 0.45 | 0.78 | 66.6 | 27.0 | 1.76 | 3.37 | 1.24 | 0.133 | 0.628 | 0.037 | 3.54 | 16.7 |
| 49.5 | 49.5 | 0.46 | 0.15 | 0.39 | 64.0 | 27.5 | 4.21 | 2.81 | 1.48 | 0.054 | 0.265 | 0.007 | 7.36 | 36.3 |
| 19.9 | 79.9 | 0.09 | 0.01 | 0.20 | 75.8 | 15.0 | 2.80 | 3.25 | 3.09 | 0.004 | 0.065 | 0.001 | 3.23 | 54.2 |
| — | 99.9 | 0.01 | 0.0007 | 0.099 | 91.3 | — | 1.22 | 4.00 | 3.41 | 0.0002 | 0.029 | 0.0001 | 2.00 | 289.0 | wherein
L:Co = (wt/o Co in Pb—Sn) ÷ (wt/o Co in Fe)
L:Ni = (wt/o Ni in Pb—Sn) ÷ (wt/o Ni in Fe)
L:Fe = (wt/o Fe in Pb—Sn) ÷ (wt/o Fe in Fe)
αCo = L:Co ÷ L:Fe
αNi = L:Ni ÷ L:Fe That is, removal of Co can be most effectively carried out in a 50% Sn 50% Pb bath while removal of Ni is most effectively carried out in a 100% Pb bath. TABLE 3 shows that when silicon is added after Ni is recovered from the Pb bath, the solubility of Ni in Pb is decreased so that Ni can be recovered as a Ni-Si alloy and isolated therefrom.

TABLE 3

| Recovery of Ni from Pb bath by adding Si (at 1250° C.) | | | |
|---|---|---|---|
| Pb phase (wt %) | | Ni—Si phase (wt %) | |
| Ni | Si | Ni | Si |
| 1.38 | 0 | 87.1 | 12.9 |
| 0.003 | 0 | 69.8 | 30.2 |
| 0.0007 | 0 | 50.0 | 50.0 |

As is apparent from TABLES 2 and 3, according to the method for recovering Ni in accordance with the present invention, Ni can be removed from an Fe-Ni alloy at such a high efficiency as 93% by one operation and when Si is added to a Pb bath such that a Ni-Si alloy contains higher than 30% of Si, Ni can be recovered from the Pb bath at such a high efficiency of substantially 100%.

In the case of the application of the present invention to the recovery of Ni and Co, carbon is added to an Fe.Co.Ni alloy so as to lower the melting point of the alloy and the alloy is charged into the 100% Pb bath. Thereafter a Fe phase which floats up resulting from the coexistence of two liquid phases is charged into a 50Sn 50Pb bath and a suitable quantity of Si is added to the Pb bath and the Pb Sn bath. Then, a Ni-Si alloy floats up in the Pb bath while a Fe-Si alloy with the reduced content of Co floats up in the Pb Sn bath. When Si is further added to the Sn Pb bath from which the Fe-Si phase has been separated, a Fe-Si phase in which Co is concentrated can be obtained. Silicon is removed from such Ni-Si alloy and Fe-Si alloy by the oxidation process carried out at low temperature and then transferred to a hydrometallugical refining process. Then the required quantity of chemical agents can be reduced and the transportation and handling cost can be lowered. That is, according to the present invention, at mines or ocean refineries, low-quality minerals containing Ni and Co can be separated into slag and iron alloys containing concentrated Ni and Co amount so that costs for transporting valuable metals and costs required for disosal of residues can be lowered.

It is of course apparent that the present invention may be equally applied to enrichment of Ni in ferronickel, removal of iron from stainless steel scraps and enrichment of Co and Ni.

Meanwhile it was reported that in the case of reduction smelting of manganese nodules in a metallurgical furnace such as a blast furnace or an electric furnace, slag comprising manganese oxide and pig iron containing Co, Ni and Cu are obtained. The present invention can be advantageously applied as pre-treatment of the prior method for recoverying Co, Ni and Cu from such iron alloys; that is, the complicated prior art method consisting of a combination of oxidization and sulfidization processes with a hydrometallugical refining process including an oxidization leaching process under a high pressure can be simplified.

Figure 7:
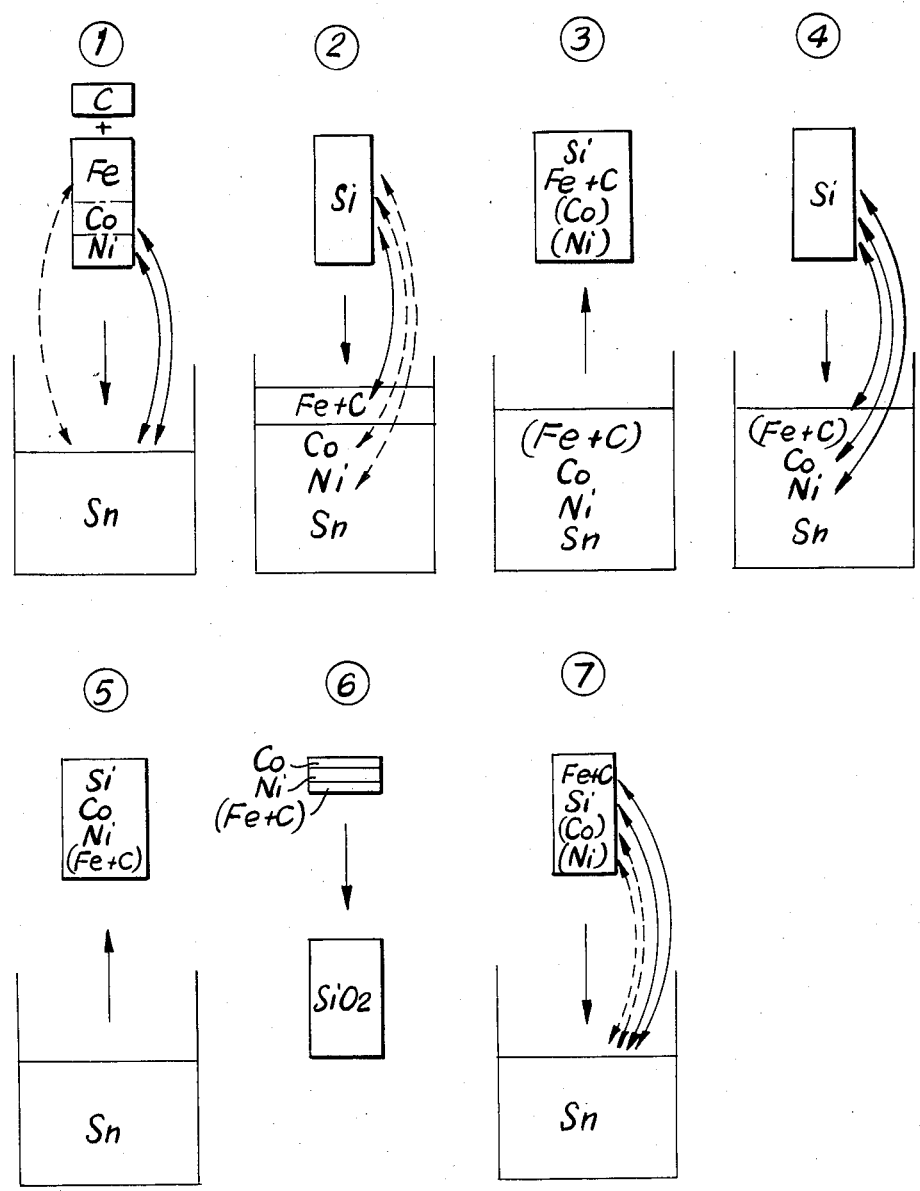
FIG. 7 shows the steps of a second embodiment of the present invention for separating cobalt and nickel from an alloy.

FIG. 7 shows a second embodiment of the present invention which is based on the underlying principle described above with reference to FIGS. 3 and 4 and which utilizes the fact that the distribution ratios of Co and Ni between the Sn and Si phases are greater than the distribution ratio of Fe (as shown in Table 1, case a). The second embodiment of the present invention comprises, as shown in FIG. 7, a combination of ① a step for charging a alloy steel which is carbonized into a molten bath of Sn or the like;
② a step for adding silicon;
③ a step for separating a Fe-Si phase;
④ a step for further adding Si;
⑤ a step for separating a Fe.Co.Ni-Si phase;
⑥ a step for removing Si; and
⑦ a step for remelting an iron alloy containing Co and Ni.

In the first step for charging a carbonized alloy steel into a molten bath of Sn or the like, a high alloy steel containing Co and Ni is carbonized to reduce its melting point and is charged into a molten bath of Sn, Pb and/or an alloy thereof said bath weight is more than about ten times the weight of as the carbonized alloy steel. (Since the bonding strength between Fe and C is strong, instead of Fe.Co alloys, Fe is described hereinafter.)

In the second step for adding Si, Si is charged into the molten bath as indicated by the solid-line arrow so that the solubility in the Pb or Sn bath is reduced and a Fe-Si phase floats up while parts of Co and Ni remain in the molten bath.

In the third step for separating a Fe-Si phase, the floating Fe-Si phase is separated and recovered as indicated by the arrow.

In the fourth step for further adding Si, Si is further added to the molten bath as indicated by the solid-line arrows so that the solubility of Co and Ni in Sn or Pb is lowered and the formation of Fe.Co.Ni-Si phase is facilitated as indicated by a solid line; A small quantity of Fe still remaining after the third step is combined with Si and a mixture of Fe and Si floats up.

In the fifth step for separating Fe.Co.Ni-Si, the floating mixture of Fe, Co, Ni and Si is separated and recovered as indicated by the arrow.

In the sixth step for removing Si, a prior art oxidization method at low temperatures is utilized so as to oxidize Si in the mixture of Fe, Co, Ni and Si, whereby resulting $SiO_2$ is removed.

In the seventh step for remelting an iron alloy containing Co and Ni, the mixture which consists of Fe, Co and Ni and in which the content of Si is adjusted is recharged into the molten bath as indicated by the arrow. Thereafter, the second to seventh steps are repeated.

As in the case of FIG. 2, the broken line indicates a relatively weak bonding strength.

As described above, according to the present invention, immiscible liquid phases are formed and the separation or concentration is effected using the difference in distribution ratios of Fe, Co and Ni in the two liquid phases.

Experiments substantially similar to the first, second and third examples of the first embodiment were made and similar results were obtained (See FIGS. 5 and 6). The second embodiment of the present invention can also attain the effects, features and advantages substantially similar to those attained by the first embodiment.

When the reduction in volume and decontamination of various devices and equipment including those made of stainless steel are taken into consideration, the distribution ratio of Ni is by far greater than those of Co and Fe in the case of Fe.Ni.Co alloys. Furthermore, the lesser the quantity of the iron alloy charged into the Sn bath, the more economically the Co and Ni can be removed from Fe Co alloys and Fe Ni Co alloys. Instead of a Sn bath, a Sn Pb bath or a Pb bath may be used in combination with pig iron. A Fe-Si phase is oxidized to remove Si and the resulting $FeO-SiO_2$ slag contains a less quantity of Co.

Figure 8:
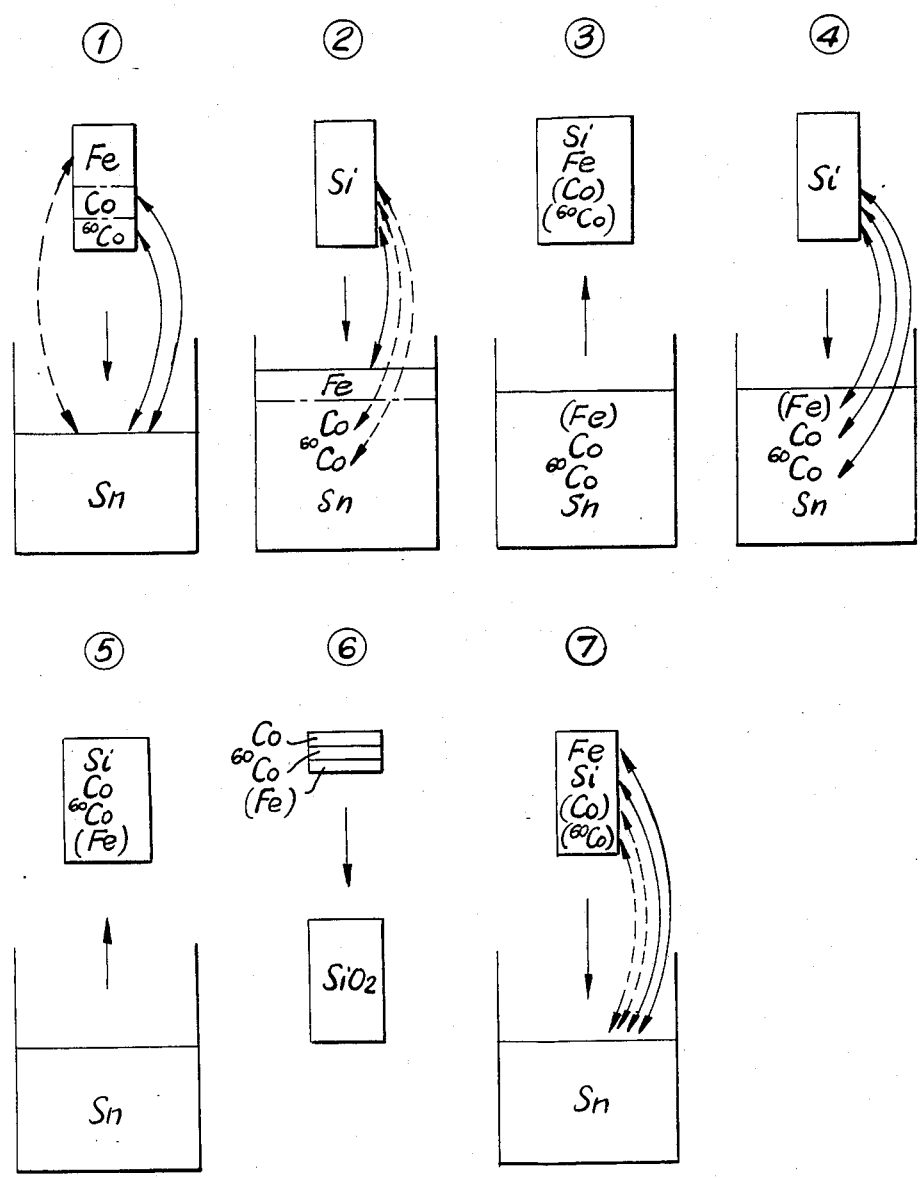
FIG. 8 shows the steps of a third embodiment of the present invention.

FIG. 8 shows a third embodiment of the present invention which is based upon the underlying principle described above with reference to FIGS. 3 and 4 and which utilizes the fact that the distribution ratios of Co and Ni in the Sn.Fe phase and the Fe-Si phase as shown in TABLE 1(a) are greater than the distribution ratio of Fe. The third embodiment comprises, as shown in FIG. 8, a combination of ① a step for charging radioactive iron alloys added with non-radioactive Co into a molten bath of Sn or the like;
② a step for adding Si;
③ a step for separating a Fe-Si phase;
④ a step for further adding Si;
⑤ a step for separating a Fe.Co-Si phase;
⑥ a step for removing Si, and
⑦ a step for remelting an iron alloy containing Co.

In the first step for charging iron alloys added with non-radioactive Co into a molten bath of Sn or the like, an iron alloy containing radioactive Co is added with nonradioactive Co and is charged into a molten bath of Sn, Pb and/or an alloy thereof said bath weight is more than ten times as heavy as the iron alloy. (Since $^{60}Co$ and Co have the same physical and chemical properties, only Co is described hereinafter).

In the second step for adding Si, Si is charged as indicated by the solid line. Then the solubility of Fe in Pb or Sn is lowered so that a Fe-Si phase floats up in the molten Sn bath while Co remains in the molten bath.

In the third step for separating a Fe-Si phase, the floating Fe-Si phase is separated and recovered as a mixture as indicated by the arrow.

In the fourth step for further adding Si, Si is charged again into the molten bath as indicated by the arrow so that the solubility of Co in Pb or Sn is lowered and the formation of a Co-Si phase is facilitated as indicated by the solid lines. Furthermore, a very small quantity of Fe still remaining after the third step is combined with Si and the mixture of Fe and Si floats up in the molten bath.

In the fifth step for separating a Fe.Co-Si phase, the floating mixture of Fe, Co and Si is separated and recovered.

In the sixth step for removing Si, a prior art low-temperature oxidization method is utilized to oxidize Si of the mixture of Fe, Co and Si. The resulting $SiO_2$ is removed.

In the seventh step for remelting an iron alloy containing Co, the mixture of Fe and Co is charged again into the molten bath and melted. Thereafter the above-descrived second to seventh steps are repeated.

As in the case of FIG. 2 or 7, the broken line shown in FIG. 8 shows a relatively weak bonding strength.

As described above, according to the present invention, two liquid phases are formed and the separation or concentration is effected using the difference in distribution ratios between Fe and Co in the two liquid phases.

Experiments similar to the first practical example of the first embodiment were conducted and similar effects were obtained. However, since radioactive Co (for instance, $^{60}Co$) and nonradioactive Co are similar in physical and chemical properties, the experiments on 100% of nonradioactive Co were conducted and then the discussions on radioactive were carried out.

First example of radioactive Co

Let us consider 495 kg of iron alloys (mild steel) obtained upon dismantlement of a nuclear power station and containing 2 ppm radioactive Co ($^{60}Co$). The radioactivity is $$0.6 \times 10^{-2} \mu Ci/g \times 495000 \text{ g} = 2970 \text{ Ci}$$

Ten tons of 50%Pb—50%Sn is maintained at 1250° C. under an inert atmosphere of, for instance $N_2$ in a melting furnace such as an induction melting furnace equipped with gas purge system including a filter or filters capable of sufficiently removing dust. 495 kg scrap and 5 kg of pure Co are charged in the molten bath and are melted. When metallic silicon is added to the Pb.Sn bath, a Fe-Si phase floats up and two liquid phases coexist.

Figure 9:
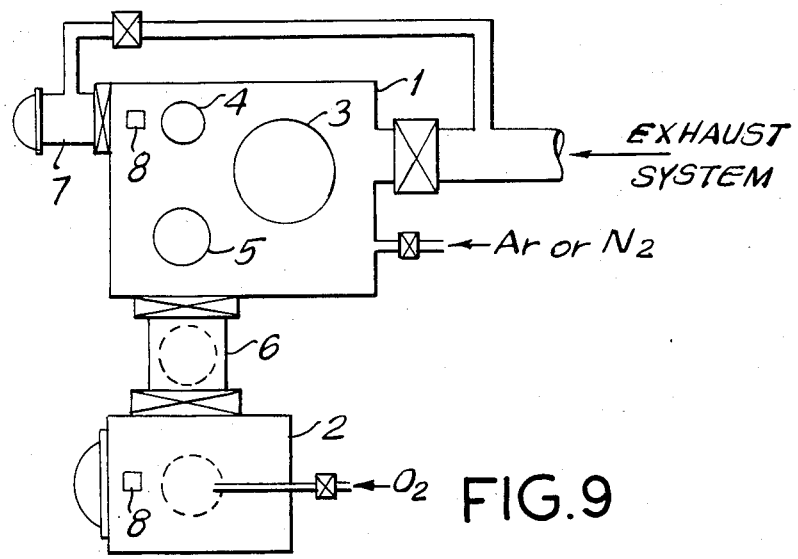
FIG. 9 shows a schematic view of a furnace for treating iron alloy scraps discharged form a nuclear power plant.

As schematically shown in FIG. 9, an iron-alloy-scrap treatment furnace used comprises two atmosphere controlled chambers 1 and 2, a melting furnace 3 and two holding furnaces 4 and 5. The first chamber 1 can be evacuated while oxygen blowing can be effected in the second chamber. A transfer chamber 6 is placed between the first and second chambers so as to transfer the holding furnace. Reference numeral 7 designates an ingot discharging chamber, and 8, an ingot case.

Next the mode of operation of the treatment furnace with the above-described construction will be described. A Fe-Si phase (I) formed by the first addition of Si is poured into the holding furnace 4 by tilting the melting furnace 3. After the melting furnace is returned to its normal position, Si is further added thereto for the second time so as to form a Fe-Si phase (II). The melting furnace 3 is tilted so that the Fe-Si phase (II) is poured into the holding furnace 5 and is separated from the Pb Sn bath. When the melting furnace 3 is returned to its normal position, the Fe-Si phase (I) is charged from the holding furnace 4 into the melting furnace 3 and the quantity of Si is adjusted to form a Fe-Si phase (III), which in turn is charged back into the holding furnace 4. Thereafter, Si is further added so that a Fe-Si phase (IV) is formed and is poured into the holding furnace 5. Therefore, the Fe-Si phase (IV) and the Fe-Si phase (II) are received in the same holder furnace 5. The above-described steps are repeated seven times. Then 387 kg of a Fe 18%Si alloy containing 0.05% of Co is obtained from the holding furnace 4 while 346 kg of a Fe-34% Si alloy containing 1.39% of Co is obtained from the holding furnace 5. In this case, the radioactive concentration in the holding furnace 4 is $$2970 \times 0.195 \times (1/5) \div 389000 = 2.98 \times 10^{-4} \mu Ci/g$$

and this concentration is on the same order of the natural radioactive concentration reference level of $1.0 \times 10^{-4} \mu Ci/g$. Therefore, the alloy in the holding furnace 4 can be cast into an ingot and be used to produce ferrosilicon.

The holding furnace 5 is transferred into the second chamber 2 and is subjected to the oxygen blowing so that 370 kg of slag containing 0.07% of Co and 104 kg of iron containing 4.21% of Co are obtained. The radioactive concentration of slag is $$2970 \times 0.26 \times (1/5) \div 370000 = 4.17 \times 10^{-4} \mu Ci/g$$

and is on the same order of the natural radioactive concentration level. The radioactive concentration of 140 kg of molten iron is $$2970 \times 4.38 \times (1/5) \div 104000 = 2.5 \times 10^{-2} \mu Ci/g$$

so that a material with reduced volume must be stored under severe control is 104 kg of iron ingot. Therefore, according to the present invention, decontamination of, reduction in volume of and reuse of iron alloy scraps resulting from dismantlement of a nuclear power plant can be carried out simultaneously.

Second example of radioactive Co

Ten tons of a Sn bath is maintained at 1350° C. and 495 kg of iron scraps containing 2 ppm radioactive Co is used. Experiments are conducted based on the data shown in FIG. 5 and according to the procedure described above in the first example of the third embodiment. As in the case of the first example of the radioactive Co, 5 kg of metallic cobalt together with iron scraps are charged into an Sn bath and melted. Thereafter a suitable quantity of Si is added so that a Fe Sn phase from which cobalt has been removed (hereinafter termed as "Co-denuded" Fe-Si phase) floats up and is separated. Si is further added to the Sn bath so that a Fe-Si phase having concentrated cobalt (hereinafter termed as "Co-enriched" Fe-Si phase) floats up. The first-mentioned Co-denuded Fe-Si phase is charged back or returned into the Sn bath and the quantity of Si is adjusted so that a second Co-denuded Fe-Si phase floats up and is separated. Next Si is further added to the Sn bath so that a second Co-enriched Fe-Si phase floats up and is combined with the first Co-enriched Fe-Si phase. The above-described steps are repeated. A forth denuded Fe-Si phase is 200 kg in weight and contains 0.006% of Co. The radioactive concentration of this Fe-Si phase is $$0.6 \times 10^{-2} \times 495000 \times 0.012(1/5) \div 200000 = 3.5 \times 10^{-5} \mu Ci/g$$

The Co-enriched Fe-Si phases amounts to 580 kg, containing 360 kg of Fe and 220 kg of Si. When Si is removed by oxygen blowing, about 440 kg of slag and about 350 kg of Fe bath are obtained. Thus the iron alloys which can be re-used amounts to 200 kg while the material which must be stored under severe control amounts to 350 kg.

That is, when a small quantity of metallic Co is added to iron alloy scraps which contains an extremely small amount of radioactive Co and which are discharged from a nuclear power plant and the above-described steps are repeatedly cycled, a Fe-20% Si alloy which can be re-used to produce ferrosilicon and Co-enriched Fe-Si alloy are obtained. When the Fe-Si alloy is oxidized at low temperatures, slag with an extremely low radioactivity can be separated from a Fe Co alloy with increased radioactivity. In view of their the melting speed of iron alloys and of solubility, it is preferable that the lower limit of the temperature of the Sn bath, lead bath or Sn Pb bath is maintained at 1200° C. and the upper limit of the temperature is maintained at 1400° C. so as to prevent the loss of lead by evaporation and the losses caused by drossification of Pb and Sn.

The various excellent effects, features and advantages of the methods of the present invention for separating Co and Ni from alloys may be summarized as follows:

(1) The reduction in volume of relatively less contaminated iron alloys from a nuclear power station can be accomplished without discharging a large quantity of secondary waste.

(2) Not only the scraps are reduced in volume, but also they are so decontaminated that part of their Fe contents can be re-used.

(3) The solubility of iron in Sn or Sn Pb alloy is varied by the amount of Si added so that, as compared with a method in which the temperature is varied, the thermal energy consumption can be minimized and the useful life of a melting furnace can be increased.

(4) Sn, Pb and Sn.Pb alloys can be repeatedly used.

(5) Because of pyrometallurgical refining, high productivitiy can be ensured.

(6) The present invention can be applied to the concentration or extraction of valuable metals from low-grade minerals such as manganese nodules containing Fe, Co and Ni. The transporation cost, the required quantities of chemical agents and the installation space can be remarkably reduced. In view of the disposal of waste, pyrometallurgical refining can be realized under the conditions more advantageous than those of hydrometallurgical refining.

(7) It becomes possible to extract valuable metals such as Co and Ni from spent component parts in aircraft engines and gas turbines.

(8) Radioactive metals such as $^{60}$Co can be separated into slag having an extremely low level of radioactivity and a condensed Fe Co alloy depending upon purposes.

What is claimed is:

1. A method for concentrating and separating cobalt and nickel from an alloy comprising cobalt, nickel and iron, comprising the steps of melting the alloy in a molten bath of tin, lead and/or an alloy thereof whose weight is more than 10 times as heavy as said alloy and adding silicon into said molten bath, thereby causing a first separation of a Fe-Si phase to float up and separating said fiirst supernatant phase.

2. The method according to claim 1 wherein the step of floating and separating said Fe-Si phase is succeeded by a step of adding additional silicon to said molten bath, thereby causing second separation of a Fe.Co.Ni-Si phase to float up and then separating said second supernatant phase.

3. The method according to claim 2 further comprising a step of removing silicon from said separated Fe.-Co.Ni-Si phase.

4. The method according to claim 2 further comprising a step of melting said first separated Fe-Si phase into a molten bath of tin, lead and/or an alloy thereof.

5. A method for concentrating and separating cobalt and nickel from a alloy steel containing cobalt and nickel comprising the steps of carbonizing the alloy steel, melting said carbonized alloy steel in a molten bath of tim, lead and/or an alloy thereof whose weight is more than 10 times as heavy as said alloy and adding silicon to said molten bath, thereby causing a first separation of a Fe-Si phase to float up and removing said first supernatant phase from said bath.

6. The method according to claim 5 wherein said step of causing said Fe-Si phase to float up and be separated is succeeded by the step of adding silicon into said molten bath, thereby causing a second separation of a Fe.-Co.Ni-Si phase to float up and then by the step of removing said second supernatant phase.

7. The method according to claim 6 further comprising the step of removing silicon from said separated Fe.Co.Ni-Si phase.

8. A method for separating cobalt and nickel from an iron alloy containing radioactive cobalt, comprising the steps of adding nonradioactive cobalt, to the iron alloy, melting said iron alloy in a molten bath of tin, lead and/or an alloy thereof whose weight is more than ten times as heavy as said alloy and adding silicon to said molten, thereby causing a first separation of a Fe-Si phase to float upon said bath and then removing said supernatant phase.

9. The method according to claim 8 wherein said step of causing said Fe-Si phase to float up and be separated is succeeded by the step of adding silicon into said molten bath, therebycausing a second separation of a Fe.-Co-Si phase to float upon said bath and then by the step of removing said second supernatant phase.

10. A method according to claim 9 further comprising a step of removing silicon from said separated Fe.-Co-Si phase.

11. The method according to claim 9 further comprising a step of reintroducing said first separated Fe-Si phase into said molten bath of tin, lead and/or an alloy thereof after removal of said second separated phase.

* * * * *